Figure 1:
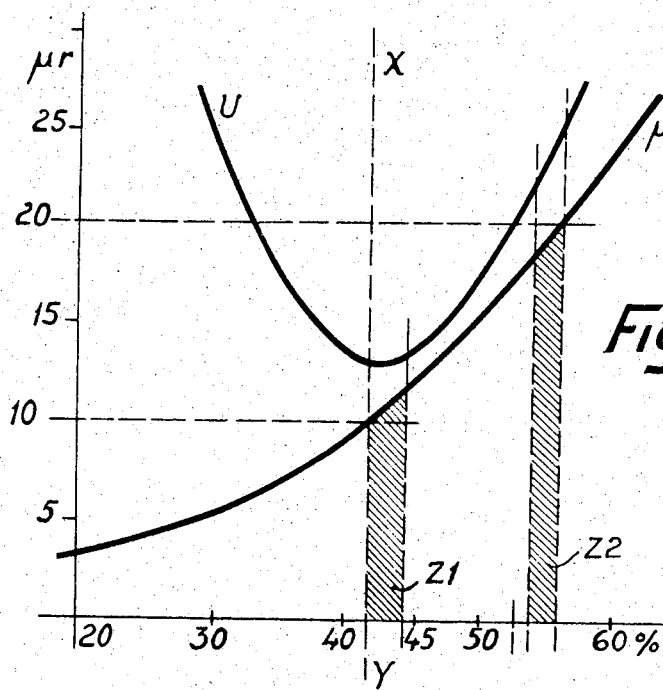

United States Patent Office 3,360,475
Patented Dec. 26, 1967

3,360,475
MAGNETIC FRICTION PACKINGS
Jean Rossez, Fontenay-sous-Bois, Hauts-de-Seine, France, assignor to Compagnie des Machines Bull (Société anonyme), Paris, France
Filed Mar. 31, 1964, Ser. No. 356,118
Claims priority, application France, Apr. 3, 1963, 930,246; Mar. 5, 1964, 966,153
3 Claims. (Cl. 252—62.52)

The present invention relates to improvements in magnetic friction packings and more particularly to improvements for increasing wear resistance, stabilizing mechanical characteristics (coefficient of friction), reducing residual magnetization and under certain conditions improving magnetic permeability and weldability of the magnetic friction packings produced by sintering of a mixture consisting mainly of iron powder and polytetrafluoroethylene powder.

A magnetic friction packing is a coating designed to form a bearing, an abutment, or a brake or clutch lining between surfaces in frictional engagement in a mechanism, the said packing being adapted to be traversed at least partly, and permanently or temporarily, by an intense magnetic field and being designed to have at the moving surfaces a coefficient of friction adapted to particular conditions of use.

It is known from a patent applied for in the United States on Jan. 15, 1963, Ser. No. 251,650, by the applicants, to produce a magnetic friction packing by sintering an intimate mixture of powders of polytetrafluoroethylene with 41–45% of mixture, by volume of iron powder said iron powder being formed of at least 65% by volume of iron having a grain size in the neighbourhood of 100 microns and about 35% of iron having a grain size of less than 5 microns. A magnetic packing thus produced may be welded to a metallic support such as iron or steel by known methods. After welding, the packing adheres sufficiently well to its support to permit machining of the said packing to a thickness below 0.3 millimeter. An increase in the iron charge in the mixture, above the above-indicated proportions, sometimes necessitates the application of special welding processes in which there is introduced an intermediate bonding layer which, from the viewpoint of the magnetic permeability of the packing, generally results in a loss of the advantages of the high iron content in the packing proper. On the other hand, the use of highly divided iron naturally favours, in the course of the sintering, the formation of iron oxides whose magnetic remanence is not negligible in particular applications and which oppose the direct adhesion of the polytetrafluoroethylene and the metal. The present invention relates to improvements for obviating these disadvantages and increasing the stability of the mechanical characteristics of magnetic friction packings, as also to the use, in the preparation of magnetic friction packings, of iron powder which has undergone a prior gas chromising treatment. The iron powder employed will preferably consist of crushed and screened Swedish iron sponge, for example iron powder known as Höganäs iron sponge powder, which is commercially supplied in various qualities and grain sizes by the Swedish company Höganäs. For example, the grade MH 300 consists of almost pure iron particles of varied shapes, having a maximum size of less than 60 microns, and comprises about 80% of iron particles having a size of less than 44 microns. This iron powder is subjected, optionally after a de-oxidising treatment, to a treatment known as gas chromising. A chromising process is known, which consists in the association of an elementary thermal treatment and of a thermochemical diffusion treatment by means of chromium (integrated chromising). The chromising imparts to the iron powder a very effective anti-corrosive protection which renders it proof against attack by nitric acid, even at boiling point, with an extent of chromium incorporation which decreases from the periphery to the centre of the iron particles, and which remains in all below 12%. Since this chromising treatment need not be limited to the periphery of the iron particles, large quantities of iron sponge can be simultaneously treated in conventional industrial installations without any particular precautions.

A magnetic friction packing produced with a chromised iron powder may comprise a higher percentage of metallic charge than in the case where non-chromised iron is employed, while retaining its properties of weldability to a metallic support. This result is due to the fact that the bonding between the metal of the powder and the metal of the support on the one hand and the polytetrafluoroethylene on the other hand can take place directly without any metallic oxide becoming interposed and constituting a screen without a strong bond to the polytetrafluoroethylene. Thus, the magnetic permeability and the thermal conductivity of the magnetic friction packing are increased.

In addition, by appropriately choosing the percentage of iron powder incorporated in the mixture, the grain size and the shape of the grains, magnetic friction packings are obtained, of which the coefficient of friction may be intentionally low or very high and completely adapted to the various cases of use, for example for anti-friction packings or for linings of couplings. Moreover, the specific coefficient of friction of the magnetic friction packings thus formed is substantially independent of the operating variables: pressure, speed and temperature.

The following description concerns processes of producing friction linings and parts provided with linings, more particularly adapted for use in magnetic clutches, brakes, torque limiters and the like.

Magnetic packings produced by these processes have relatively high magnetic permeability, remarkable wear resistance and stable friction characteristics which are particularly advantageous for the production of friction linings adapted to operate under prolonged overload conditions or at relatively high temperatures. In the accompanying drawing, FIGURE 1, which is given only by way of indication, corresponds to mean values of results of measurements made on many specimens of magnetic friction packings tested under comparable conditions of use, and gives the curves representing the wear (curve U of relative wear) and the relative magnetic permeability (curve $\mu r$) as a function of the proportion of chromised powder in the mixture employed.

The wear resistance is the relative quantity of the material of the lining worn during a given time, taken as unity. The abscissae of the curves of FIGURE 1 represent the relative percentage by volume of the chromised iron powder entering the composition of the mixture of the powders before compression and sintering. These curves have been prepared under identical conditions of pressure, linear velocity and temperature for all the specimens.

The magnetic friction packings produced in accordance with the invention to form friction linings in magnetic clutches or the like have characteristics of wear resistance and relative magnetic permeability which are particularly advantageous for compositions situated in a region to the right of the line X–Y of FIGURE 1. A magnetic friction packing (which will hereinafter be called "M.F.P." by abbreviation) exhibiting the characteristics of the zone Z1, is characterised by a high wear resistance with an already considerable relative magnetic permeability (about 10 in relation to air), while a magnetic packing having a higher chromised iron powder content and whose characteristics correspond to the zone Z2 exhibits almost double the magnetic permeability, but less good wear resistance. It is obvious that by an appropriate choice of the grain size structure and the introduction of an appropriate proportion of chromised iron powder into the mixtures, it is possible to obtain products exhibiting intermediate characteristics which are completely suitable for the applications envisaged. It is to be noted that M.F.P. whose characteristics are situated to the left of the line X–Y of FIGURE 1 have, from the viewpoint of the invention, progressively less usefulness as they are further from the said line X–Y, owing to the fact that the wear increases at the same time as the relative magnetic permeability decreases. In accordance with the foregoing, a M.F.P. formed to satisfy the characteristics represented at Z1 in FIGURE 1 has a relative magnetic permeability higher than 10 and a very low degree of wear, which is scarcely affected by the pressure of utilisation, with a stable coefficient of friction under conditions of pressure, relative linear velocity of the surfaces and temperature which will hereinafter be more clearly defined. The possibility of attaching these linings to metallic supports by employing known sticking or welding methods, as also a good machinability of the sintered material permit of producing linings of very small thickness, low reluctance and good thermal conductivity, which favour a heat dissipation which is particularly advantageous for devices which are likely to operate under heavy load or under prolonged conditions of overload. A high resistance to corrosion and in particular to oxidation at high temperature contributes to ensuring great stability of the characteristics of the linings as a function of time.

Figure 2:
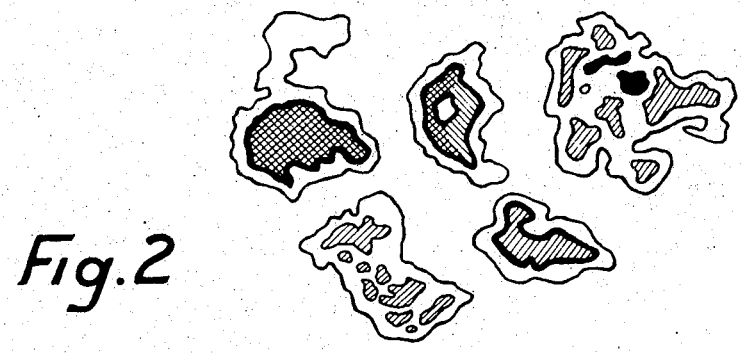

For the preparation of a friction lining conforming to the characteristics of the zone Z1 (FIGURE 1), use will preferably be made of a substantially pure iron powder containing less than 0.15% of carbon with less than 1.15% of impurities ($O_2$, $SiO_2$, S, P) and a substantially uniform grain size around 35 microns, the iron grains being advantageously of irregular shape (see FIGURE 2 of the accompanying drawing). Such iron powders of appropriate structure and compositions are commercially obtainable. A powder marketed under the name "Höganäs" Swedish iron sponge powder, type MH 300–28 has an overall density of about 2.8 g./cc. with a packing degree of 35.7%. From the viewpoint of grain size, this iron powder contains on average less than 4% of grains having a diameter of more than 60 microns, from 5% to 15% of grains whose diameter is between 60 and 44 microns, and from 80% to 90% of grains having a diameter of less than 44 microns. After optional de-oxidation pre-treatment, the iron powder is subjected to a gas chromising treatment, for which a number of processes are known. One process consists in placing the iron powder in the presence of a magnesic material (consisting of a mixture of magnesia and chromium containing from 40% to 50% of chromium in the form of powder having a mean grain size of 1 micron) under suitable temperature and atmosphere conditions.

In this process, a diffusion of chromium takes place in the grains to a depth of about 4 microns with a chromium content decreasing from 50% to 0% from the periphery towards the centre of the grains, the total chromium content of the powder remaining, however, below 12% and preferably descending to 5%. As a result of this treatment, the iron of the grains, having a density of 7.84 before chromisation, becomes a non-homogeneous ferro-chromium having a density of about 7.75 and the packing degree of the powder changes from 35.7% to 37% with a total density of about 2.85. Such a powder is commercially obtainable. For the production of linings having a high iron content it is possible, if desired, to "densify" the powder by passing it, for example, for several hours into a rotary or jolting drum. This operation has above all the effect of separating the grains attached in the course of the chromisation and of rounding off a number of rough edges, thus facilitating the compaction of the mixture. After chromisation, optionally followed by densification, there is obtained a powder of substantially uniform grain size of about 37 microns, of which the grains, however, retain irregular shapes (as shown in FIGURE 2, which illustrates in section chromised grains enlarged about 500 times).

Treatment with NITAL (4% nitric acid and methyl alcohol) causes the parts comprising less than 13% of chromium to appear very distinctly (hatched in FIGURE 2), the parts remaining blank in the grains having a higher chromium content. After chromising, the iron powder consists of grains absolutely free from any surface trace of oxidation, and is found to be particularly suitable for forming a homogeneous and tough mixture by sintering with polytetrafluoroethylene (also called PTFE). The chromised iron powder obtained as indicated above is absolutely proof against attack by boiling nitric acid. According to the applications envisaged, the characteristics of a mixture may be slightly modified (improved from a given viewpoint) by the addition of appropriate fillers, but in such small proportions as not substantially to modify the basic characteristics of the product obtained. Thus, for friction linings, the addition of from 1% to 10% by volume of glass fibres about 7 microns in diameter and 150 microns in length substantially improves the resistance to wear by friction. Linings having substantially the characteristics indicated at Z1 (FIGURE 1) will be obtained from a mixture comprising, for example, by volume, 49% to 55% of PTFE,
41% to 45% of chromised iron,
10% to 0% of glass fibres.

It will be recalled that, theoretically, a powder formed of contiguous iron globules all having the same diameter would have a total density of about 4.05 for a packing degree by volume of 52.5%. A chromised iron powder having a grain size regarded as relatively "homogeneous" does not substantially permit of exceeding the packing degree of 52.5% indicated above. In the case of a lining which is to have the characteristics of Z1, this packing degree would be regarded as too high and undesirable, because a so-called "homogeneous" grain size permits of constituting by sintering a product having a high-tenacity PTFE skeleton which completely bonds the chromised iron grains contained therein and thus ensures remarkable wear resistance. On the other hand, in order to satisfy particular conditions of use, for example for producing equipment destined for destruction after a predetermined maximum duration of operation, and for producing linings having high magnetic permeability rendering possible high electromagnetic output of the devices constructed, iron contents equal to or higher than 55% can readily be provided with chromised iron powders. For this purpose, use is made of "non-homogeneous" powders, that is to say those comprising grains having very different grain sizes, so that, when mixed in appropriate proportions and then compressed, the small grains completely fill the spaces which would be free between the larger ones. The high iron contents thus produced permit of producing relative permeabilities which may reach or even exceed 20 (zone Z2 of FIGURE 1), but this is partly achieved to the detriment of the wear resistance and the mechanical strength of the lining.

According to the conditions under which M.F.P. is expected to be used in friction linings, it would also be possible without departing from the invention to substitute for chromised iron a ferro-chromium powder having, for example, a chromium content of about 13% and appropriate grain-size characteristics. However, the intrinsic relative magnetic permeability of a ferro-chromium powder is substantially lower than that of a chromised iron powder having a comparable total chromium content and has much lower resistance to corrosion. Nevertheless, if necessary, the total permeability may be improved by using a higher iron content, which is attained with powders having less homogeneous grain size, but the resistance to corrosion of these ferro-chromium alloy powders can only be improved by a chromium content which is distinctly higher than the total chromium content of a chromised iron powder, and this to the detriment of the magnetic permeability. For applications of M.F.P.'s under well-defined conditions, however, satisfactory results have been obtained with a ferro-chromium containing 13.5% of chromium, but as compared with the results obtained with M.F.P.'s containing chromised iron, lower wear resistance and relative magnetic permeability are observed which, under comparable conditions of use, locate the characteristics of the M.F.P. containing ferro-chromium generally to the left of the line X–Y of FIGURE 1, or with a distinctly higher degree of wear and lower resistance to corrosion.

Polytetrafluoroethylene or PTFE is a plastic material of the fluorohydrocarbon series, which is very well known for its dry self-lubricating properties, for its chemical inertia, for its resistance to corrosion and for its behaviour at relatively high temperatures. The PTFE employed for the production of M.F.P. for use in friction linings may be, for example, of the type sold by the company Du Pont de Nemours under the name "Teflon 7" with a grain size of about 35 microns. In block, Teflon has a density of about 2.15, but in powder form its volume is multiplied by about 7 (in the case of Teflon 7). The mechanical strength of Teflon 7 in friction linings is remarkable, but it is equally possible to use a PTFE commercially supplied by Imperial Chemical Industries (I.C.I.) under the name Fluon G4 with a grain size of about 50 microns.

For the preparation of friction linings having, for example, the characteristics indicated at Z1 (FIGURE 1) the powders are first mixed in proportions within the above-indicated limits, whereafter they are intimately mixed in a blade-type agitator, for example rotating at 3000 r.p.m. for 1 minute 30 seconds to 2 minutes, for a total weight of mixture of about 2 kg. It is advantageous to effect this mixing after the whole has been brought to a fairly low temperature in the neighbourhood of −40° C., for example, in order to lessen the so-called "premature fibring" effect of PTFE. After intimate mixing of the powders, the whole is gradually compressed on a blank or in a mould, under a pressure between 400 and 2000 kg./cm.$^2$, depending upon the mixture treated. The blank in question generally consists of soft iron. The pressure is maintained for 2 or 3 minutes at a temperature of 23–25° C., which is slightly above the transition point of PTFE (about 20° C.). The sintering may thereafter take place in the mould or outside the mould (on the blank) as in the case of articles of pure PTFE. For thin linings, having a thickness of about 2 mm., the blank is placed in a furnace at 380° C. and remains subjected to this temperature for about three hours and then, throughout the duration of the cooling, the member may be subjected to a pressure between 200 and 800 kg./cm.$^2$, the cooling being conducted at a rate of 20° to 25° C. per hour in order to obtain a molecular orientation generally called "crystallinity" of the PTFE in a proportion of 50–75%. For members of considerable thickness, the blank is preferably introduced into a furnace at 250° C., the temperature of which thereafter rises to 380° C., at a rate of 40–60° C. per hour, whereafter the treatment is continued as indicated above. The remarkable machinability of the M.F.P. obtained by this process permits of producing sheets or tapes by cutting or unwinding from large blocks. As previously indicated, linings may be fixed on soft-iron support members, generally by means of appropriate adhesives, depending upon the particular conditions of use. Thus, rubber bonding agents, epoxy resins or other appropriate adhesives will preferably be employed in a very thin layer in order that the reluctance of the adhesive layer may be substantially negligible, in the magnetic circuit as compared with that of the lining itself.

In some cases, depending upon the adhesives employed, it may be advantageous to apply, before the bonding, a chemical treatment with solutions comprising sodium ions to that face of the M.F.P. which is to be bonded, so as to eliminate fluorine atoms in the first molecular layer and to enable the adhesive to come into contact with carbon atoms. It is also possible to metallise that surface of the lining which is to be bonded, by a known method, for example by applying on it, by cathodic pulversation, a thin coating of a suitable metal or metal oxide. The grains of chromised iron flush with the M.F.P. surface to be bonded afford a strong bonding with appropriate adhesive and favour the bonding to a metallic surface correctly cleaned by a chemical or mechanical action. A chromising treatment of the surface of the support imparts thereto a particular aptitude for bonding with PTFE. A particularly useful method of attachment consists in effecting the sintering of the mixture of PTFE and chromised iron in contact with the surface of a soft iron support member as has previously been mentioned, under pressure conditions which are such as to permit a direct bonding of the PTFE with the surface of the support, which has been suitably prepared for this purpose.

A lining attached to a blank may have before machining a thickness representing 2 to 10 times the thickness of the finished lining, the lining thereafter being machined on the member itself. This procedure makes it possible to benefit fully by the advantages afforded by thin linings, the thickness of which may generally be less than 0.3 millimeter even for linings which have to withstand service of long duration. The minimum thickness to be maintained will normally be determined as a function of the expected wear for very small thicknesses, and as a function of the grain size of the magnetic powder employed.

After grinding of a lining thus produced, it is brought into contact with a soft-iron member and has a coefficient of friction of more than 0.3 and possibly reaching 0.7, depending upon the value of the contact pressure. This coefficient of friction is very stable in time, even when the operating pressures exceed 25 kg./cm.$^2$. When the service pressure remains below 18 kg./cm.$^2$, and at sliding speeds of the order of 1 meter per second, the wear is substantially zero.

Owing to the ability of such friction linings to withstand relatively high temperatures, when they are appropriately secured either by direct welding or with appropriate adhesives, a dissipation of mechanical energy in the form of heat reaching 70 w./cm.$^2$ under normal conditions for the transmission of the heat evolved to the surrounding medium may be expected.

It is obvious that the particulars given by way of example for the application of the invention have no limiting character and that any modifications in the treatment, the securing, the shaping and the thickness of the linings may be made in accordance with the circumstances and the applications without departing from the invention.

I claim:

1. A dry solid material intended to form a friction lining capable of being subjected to a magnetic field for magnetic clutches, magnetic brakes or like devices obtained from a compressed and thermally sintered mixture of powders, the said mixture consisting before sintering essentially of 49–55% by volume of polytetrafluoroethylene powder and 41–45% by volume of chromised iron powder, the latter being composed of particles of irregular form and containing at most 12% by weight of chromium.

2. A material according to claim 1, wherein the chromised iron powder consists of ground and screened Swedish iron sponge containing grains of irregular shapes and having a mean size of less than 60 microns, and chromised by gas diffusion.

3. A dry solid material according to claim 1, the mixture further containing before sintering at most 10% by volume of glass fiber.

References Cited

UNITED STATES PATENTS

| | | | |
|---|---|---|---|
| 2,191,460 | 2/1940 | Fisher | 192—107 |
| 2,354,389 | 7/1944 | Lidkea | 192—107 |
| 3,175,991 | 3/1965 | Levine et al. | 260—41 |
| 3,180,835 | 4/1965 | Peri | 260—41 |
| 2,396,629 | 3/1946 | Alfthan et al. | 264—127 |
| 2,400,099 | 5/1946 | Brubaker et al. | 252—62.5 |
| 2,885,379 | 5/1959 | Taylor et al. | 260—38 |
| 3,157,532 | 11/1964 | Galmiche | 117—100 |
| 3,177,998 | 4/1965 | Rossez | 192—84 |

FOREIGN PATENTS 1,319,438   1/1963   France.

TOBIAS E. LEVOW, *Primary Examiner.*

DON A. WHITE, HELEN M. McCARTHY, ROBERT D. EDMONDS, *Examiners.*

B. W. WYCHE, *Assistant Examiner.*